United States Patent [19]

Morrisroe

[11] Patent Number: 4,646,467

[45] Date of Patent: Mar. 3, 1987

[54] WEATHER RESISTANT COVER BAG FOR DORMANT PLANTS

[76] Inventor: John P. Morrisroe, 283 Park Dr., Palatine, Ill. 60067

[21] Appl. No.: 756,336

[22] Filed: Jul. 18, 1985

[51] Int. Cl.⁴ ............................................. A01G 13/02
[52] U.S. Cl. .......................................... 47/21; 47/26
[58] Field of Search ................... 47/21, 22, 32, 31, 30, 47/2, 20, 26; 383/76

[56] References Cited

U.S. PATENT DOCUMENTS

| 3,270,461 | 9/1966 | Fowler | 47/21 |
| 3,698,131 | 10/1972 | Kesinger | 47/2 |
| 4,006,561 | 2/1977 | Thoma et al. | 47/84 |
| 4,041,203 | 8/1977 | Brock et al. | 383/102 |
| 4,265,049 | 5/1981 | Gorewitz | 47/26 |
| 4,267,665 | 5/1981 | Wallace et al. | 47/26 |

FOREIGN PATENT DOCUMENTS

| 8002191 | 10/1981 | Canada | 47/26 |
| 2476435 | 8/1981 | France | 47/26 |
| 631865 | 9/1982 | Switzerland | 47/26 |
| 617074 | 2/1949 | United Kingdom | 47/26 |

Primary Examiner—Robert A. Hafer
Assistant Examiner—Bradley M. Lewis

[57] ABSTRACT

A cover to protect plants, such as rosebushes, azaleas, rhododendrons and the like, against winterkill and to maintain the plants in a dormant state is provided in the form of a multilayer bag with an air space between the layers, skirts or flaps at the mouth of the bag adapted to be covered with earth and a drawstring for closing the mouth of the bag around the crown of the plant. The layers of the bag permit air and vapor to breathe therethrough, but the bag is impervious to rain, snow, ice and strong air blasts. An inner layer of the bag is opaque and dark colored, preferably black, to keep the plant in a dark environment so as not to encourage premature growth. An outer layer of the bag is light colored, preferably white, to reflect the winter sun's rays. The materials forming the layers of the bag are nonwoven spunbonded textile fabrics.

The bag is formed by superimposing a pair of spunbonded nonwoven textile fabric sheets, stitching the sheets together along one longitudinal edge thereof, folding the sheets at the transverse center thereof, stitching together the folded-over opposite longitudinal edge and the overlapped ends. The stitching of the overlapped ends is terminated short of the opposite stitched together longitudinal edge. The fold is slit to the same level as the terminated stitching thereby providing a pair of flaps at the mouth of the bag. The bag is sliced to form belt loops therearound above the flaps. The bag is then turned inside out. A drawstring is threaded through the bolt loops or a tube stitched around the bag.

11 Claims, 9 Drawing Figures

U.S. Patent     Mar. 3, 1987     4,646,467
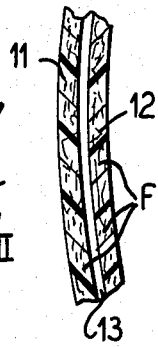
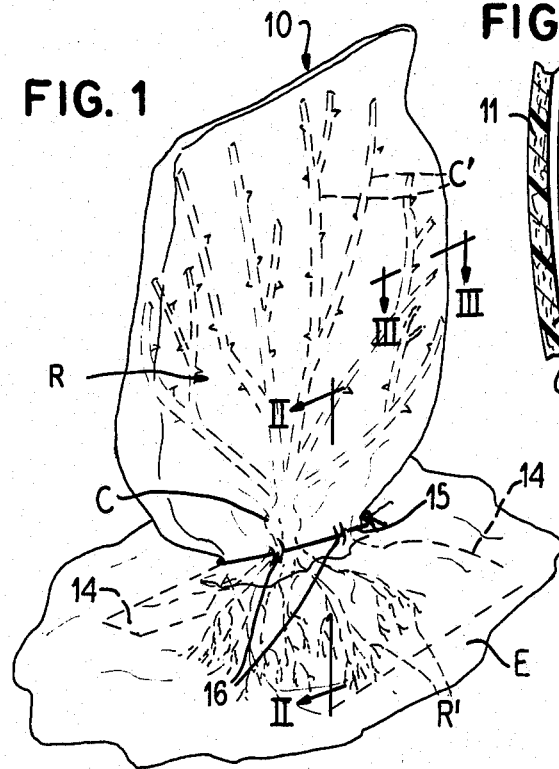
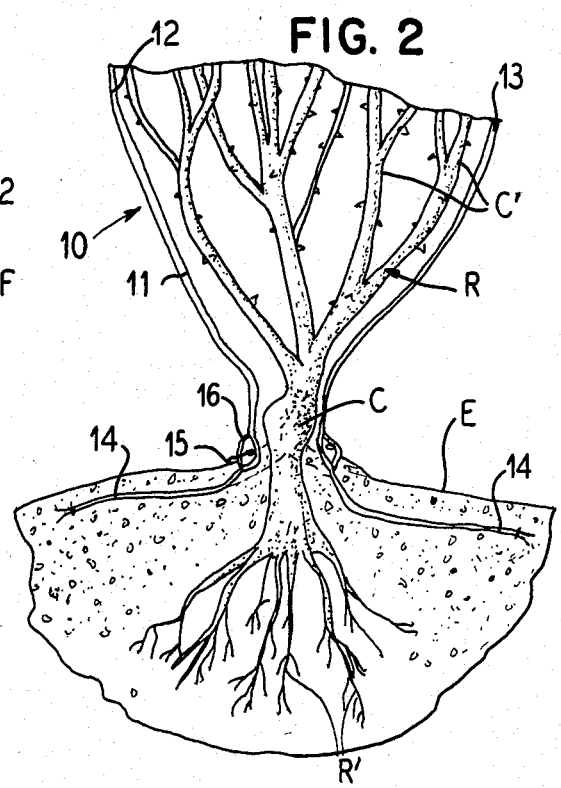
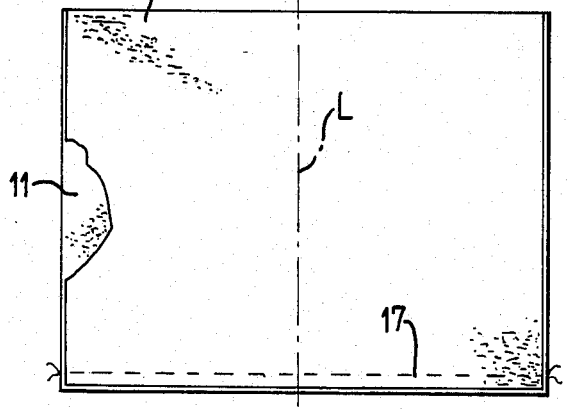
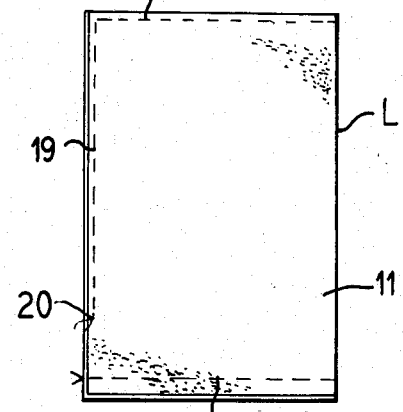
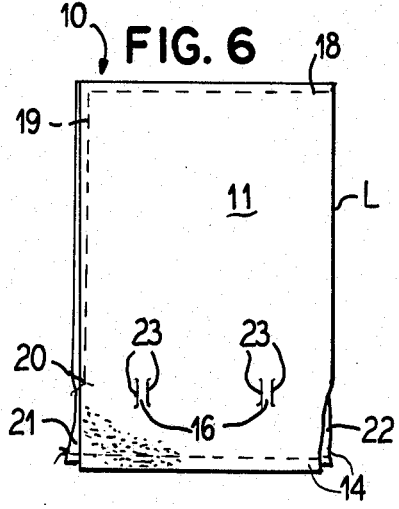
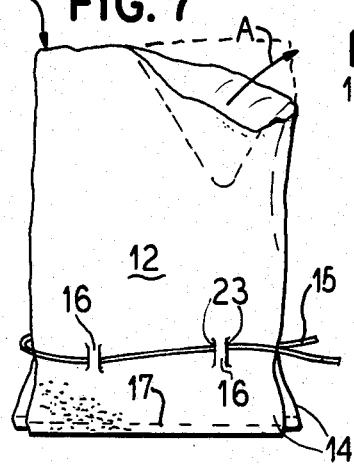
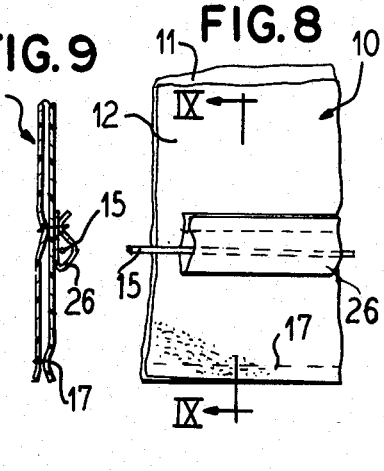

WEATHER RESISTANT COVER BAG FOR DORMANT PLANTS

FIELD OF THE INVENTION

This invention relates to the art of protecting plants against winter-kill while keeping them in a dormant condition. Specifically, the invention relates to a flexible bag for covering dormant plants which is easily draped over the plants and tied in closed condition around the plants while presenting outturned flaps around the mouth thereof to be covered with earth surrounding the plants.

THE PRIOR ART

Attempts to protect rosebushes and the like against winter-kill have generally required building up of a mound of earth, straw or hay over the crown of the bush or covering the bush with a styrofoam cone. The mounding procedure is laborious, messy, and unstable since the mound erodes and blows away under severe weather conditions. The rose cone procedure is expensive, unsightly, and provides a bulky storage problem.

It would be an improvement in this art to provide covers for rosebushes and the like which are inexpensive, easily installed and removed, capable of being compactly stored, and affording better protection than heretofore available.

SUMMARY OF THE INVENTION

This invention now provides flexible weather resisting cover bags for rosebushes and the like which will protect the bush against winter-kill and keep it in a dormant condition so as to not encourage premature growth. The invention will be hereinafter described as embodied in a cover for rosebushes, but it is to be understood that the bags of this invention are used for covering and protecting any plant including azaleas, rhododendrons and the like.

According to this invention, a multiple layer bag with an air space between the layers is easily draped over a rosebush, puckered to a closed condition around the crown of the bush and has radiating flaps or skirts covered with earth around the base of the bush. The air space between the layers substantially increases the insulation value of the bag.

The mouth of the bag is easily puckered to a closed condition by a drawstring surrounding the bag.

An inner layer of the bag is dark colored, preferably black, to keep the rosebush in a dark environment to prevent premature growth.

An outer layer of the bag is light colored, preferably white, to reflect light and keep the interior of the bush at a low temperature throughout the winter months.

The layers of the bag are nonwoven spun-bonded textile fabric sheets resistant to severe weather conditions, insects, molds, and rotting while accommodating breathing of air and vapor therethrough. These sheets are formed from synthetic plastics material fibers bonded together in sheet form. They are commonly referred to as nonwoven spun-bonded textile fabrics. They have a random fiber texture, are relatively stiff or felt like and have a glazed, plasticlike finish. The smooth glazed finish slides freely over the canes and thorns of the rosebush. The sheets are tough and non-stretchable so that the thorns do not puncture the sheets. Preferred nonwoven spun-bonded textile fabrics are prepared from thermoplastic polymers that are commonly used in fiber and film forming operations such as polyamids, polyesters, isotactic polypropylene, formed, for example, by continuous filament extrusion, drawing, web formation by use of an ejector, and bonding of the web.

A suitable nonwoven spun-bonded fabric layer for the dark or black inner layer of the bag is a polyester fabric marketed under the Trademark "Reemay" by Dupont.

A suitable nonwoven spun-bonded textile fabric for the outer light colored layer of the bag is a polypropylene fiber sheet marketed under the Trademark "Typar" by Dupont.

The fabrics preferably have a weight of about 1.5 to 2.5 ounces per yard with a thickness of about 2 to 5 mils. They are sufficiently pervious to permit a gentle breathing of air and vapor therethrough, but they will block high velocity air blasts. They are resistant to severe weather conditions and will not soften or disintegrate when exposed to rain, sleet, ice, snow, and strong air blasts. The air space between the layers provides a dead air pocket which will greatly increase the "R" or insulation factor and also disperse or deaden high velocity air flow. While the interior temperature of the bag will be about the same as the outside ambient temperature, the windchill factor of the ambient atmosphere will be dissipated. An air permeability of 200 to 400 liters of air per square decimeter per minute (Frazier Air Porosity) is desirable.

The bags may be supplied in a large range of sizes to accommodate different sized plants. For example, these sizes may vary from about 12 inches wide and 20 inches deep to about 36 inches wide and 60 inches deep, with a preferred size being about 18 by 30 inches.

The bags are easily formed from a pair of rectangular superimposed sheets of the light colored and dark colored spun-bonded woven fabrics. These sheets are secured together, as by stitching, along one longitudinal edge thereof and are then folded over along a transverse center line with the folded over longitudinal edges and ends secured together as by stitching. The end stitching is terminated in spaced relation from the initially stitched longitudinal end leaving overlying flap ends. The fold is slit to provide the opposite flap ends. The flaps are preferably about 6 to 12 inches wide depending on the depth of the bag. The assembly is then turned inside out providing a multilayer nested bag with a dead air space between the layers and with the layers held together at the closed end, the opposite open end, and one longitudinal side. A drawstring is slidably mounted around the periphery of the bag above the flaps as by threading it through belt loops which are easily formed by spaced parallel slits in the bag at spaced intervals around the periphery or by stitching a tape or a pocket forming tube for the drawstring around the bag.

The bag is easily draped over the rosebush to a level below the crown permitting the flaps to be spread outwardly and covered with earth aound the crown of the bush. The open mouth of the bag is then closed by tightening the drawstring thereby puckering the bag around the crown of the bush and securely anchoring it in position. The closed puckered bag with the radiating flaps covered with earth will protect the dormant rosebush from rodents who find the spun-bonded fabric to be distasteful and difficult to penetrate.

The bag is easily removed from the rosebush by loosening the drawstring and pulling it upward thereby opening the mouth of the bag and causing the earth covered flaps to disperse the earth away from the crown of the bush to automatically ready the bush for the growing season. The removed bags are easily flattened, folded or rolled into a compact storage condition.

It is then an object of this invention to provide multiply cover bags with an air space between the plies protecting plants against winter-kill and maintaining the plants in a dormant condition.

Another object of this invention is to provide a cover bag for rosebushes and the like composed of a plurality of layers of air and vapor permeable nonwoven spunbonded thermoplastic textile fabrics with a dark colored opaque inner layer, a light colored reflecting outer layer, an air space between the layers, a drawstring for closing the mouth of the bag around the base of the plant, and outturned flaps adapted to be covered with earth around the base of the bush.

Another specific object of the invention is to provide a cover bag for rosebushes and the like to protect the same against winter-kill and to prevent premature growth which has an inner dark colored layer, an outer light colored layer, an air space therebetween, means securing the layers together along a closed bottom, one side, and around the open mouth thereof to maintain the layers in assembled relation.

Other and further objects of this invention will become apparent to those skilled in this art from the following detailed description of the annexed sheet of drawings.

ON THE DRAWINGS

FIG. 1 is a perspective view of the cover bag of this invention mounted in position around a rosebush;

FIG. 2 is a fragmentary cross section along the lines II of FIG. 1;

FIG. 3 is an enlarged fragmentary cross section along the line III—III of FIG. 1;

FIG. 4 is a plan view illustrating the first step in the method of making the bag of this invention;

FIG. 5 is a plan view of a second step in the manufacture of the bag in this invention;

FIG. 6 is a view similar to FIG. 5, but illustrating the manner in which the mouth of the bag is slit to form flaps;

FIG. 7 is a view similar to FIG. 6, but illustrating the manner in which the bag is turned inside out to its finished condition and also showing a drawstring mounted around the bag;

FIG. 8 is a fragmentary elevational view showing another arrangement for mounting the drawstring;

FIG. 9 is a cross-sectional view along the line IX—IX of FIG. 8.

AS SHOWN ON THE DRAWINGS

The bag 10 of FIGS. 1 and 2 is illustrated as draped over a dormant rosebush R with the mouth of the bag puckered to a closed condition under the crown C of the bush and with radiating flaps of the bag covered with earth E surrounding the crown and overlying the roots R' of the rosebush R. The bag completely envelops the canes C' projecting upwardly from the crown C.

The bag 10 has a dark colored, preferably black, opaque, inner layer 11 of the above referred to spunbonded nonwoven textile fabric, and a light colored, preferably white, reflecting outer layer 12 of such material. A dead air space 13 is provided between these layers 11 and 12. The layers 11 and 12 have randomly disposed thermoplastics fibers or filaments F bonded together in lattice like sheets with minute openings between the fibers permitting the gentle passage of air and vapor therethrough while blocking the passage of air blasts, liquids or solids. The bag thus permits the rosebush R to breathe while protecting it against the ambient elements. The dead air space 13 greatly increases the R factor or insulation value of the bag.

The bag has a pair of outturned flaps 14 radiating from the mouth thereof with a drawstring 15 threaded through belt loops 16 around the mouth of the bag and pulled tight to close the mouth around the crown C.

As illustrated in FIGS. 4–7, the bag is formed by superimposing a rectangular outer layer sheet 12 on a mating inner layer sheet 11. These sheets are secured together, as by stitching 17, along one longitudinal edge thereof. The sheets are then folded along a transverse center line L to form the blank shown in FIG. 5 with the layer 11 now on the outside. The top edges of the folded blank are secured together as by stitching 18 while the overlying end edges are stitched together as at 19 with this stitching 19 terminating at 20 in advance of the stitching 17. This leaves a gap or slit 21 from the end of the stitching 19 to the open mouth of the bag. Then, as shown in FIG. 6, the fold line L is slit as illustrated at 22 to the same level as the end 20 of the stitching 19 thereby providing the flaps 14. Then spaced parallel slits 23 are formed through the blank at spaced intervals therearound level with or just above the flaps 14.

Then, as illustrated in FIG. 7, the assembly is turned inside out, shown by the arrow A, forming the bag with internal margins between the edges of the sheet and the stitching. The layer 12 now becomes the outer layer. The drawstring 15 is threaded through the slits 23 and held in position embracing the bag by the belt loops 16 created by these slits.

The stitching 17 closes the inner and outer layers 11 and 12 around the mouth of the bag, the stitching 18 closes the end of the bag opposite the mouth, and the stitching 19 closes the side of the bag and also holds the two layers 11 and 12 in assembled nested relation with the air gap 13 therebetween.

It will be understood that bonding means such as adhesive, tape, or the like, can be used to secure the layers together in place of stitching 17–19.

It will also be understood that the spun-bonded fabric is sufficiently pliant so that it can be puckered into closed condition by the drawstring 15 without splitting or tearing.

As illustrated in FIGS. 8 and 9, the drawstring 15, instead of being threaded through slits 23 and retained by the belt loops 16, can be threaded through a tube formed by stitching a tape 26 completely or at spaced intervals around the mouth of the bag.

It will be understood that the bag can be as easily draped over the canes C' of the rosebush R, the flaps 14 of the bag spread out on the ground and covered with earth E, and the drawstring 15 tightened and tied to pucker the mouth of the bag to a closed condition under the crown C of the rosebush. The bag is thus firmly held in position and will not be displaced even under severe weather conditions throughout the winter. Then, at the start of the growing season, the bag is easily removed by loosening the drawstring, and pulling it off of the bush whereupon the earth covering the flaps 14 will be dispersed outwardly around the crown C and the bush is automatically returned to its exposed growing posture.

It will be understood that modifications and variations may be effected without departing from the scope of the novel concepts of the present invention.

I claim as my invention:

1. A weather resistant cover for dormant plants while they remain planted in the ground which comprises a multi-layer bag having relatively stiff separable layers providing an air space between the layers and including a light colored outer layer to reflect sunlight and a dark colored opaque inner layer to maintain a dark environment for the plant, said bag adapted to be folded flat and having an open mouth, a closed end opposite said mouth, and closed sides between said mouth and said end, means securing said layers locally together along said closed end, said layers being imperforate but sufficiently porous to accommodate limited air and vapor flow therethrough but effective to block penetration of rain, snow, ice and air blasts, said inner layer being formed from a tough pliant glazed puncture and tear resistant plastics material film, means for puckering the mouth of the bag around the plant, and a flap below said means for puckering on each side of the bag projecting from the mouth adapted to be outturned laterally from the mouth and covered with earth.

2. A cover for protecting planted bushes in their natural outdoor environment and the like against winter-kill while preventing premature growth of the bush which comprises a multi-layer plastics material bag composed of relatively stiff separable inner and outer layers of spun-bonded plastics material fiber in nonwoven lattice sheet form permitting gentle air and vapor flow therethrough, said outer layer being light reflective, said inner layer preventing light penetration, said bag having an open mouth and a closed end opposite said mouth with said inner and outer layers having separable smooth glazed surfaces opening up to provide an insulating air space between the layers extending from the mouth to the closed end, means for puckering said mouth tightly under the crown of the bush, said cover providing a dark closed chamber for receiving the canes of the bush above the puckered closed mouth and flap means below said means for puckering adapted to cover with earth.

3. A cover bag for outdoor planted rosebushes and the like effective to protect the bush against winter-kill while maintaining it in a dark environment to prevent premature growth which comprises a two-ply imperforate pliant bag with an air space between the plies, said plies being composed of relatively stiff smooth surfaced separable air and vapor permeable imperforate woven spun-bonded thermoplastic fibers and including an inner ply of dark colored opaque material and an outer ply of light colored reflecting material, the mouth of the bag having flaps adapted to be outturned and covered with earth around the bush, and means for puckering the mouth of the bag around the bush above the flaps to close the bag tightly on the bush.

4. The cover of claim 1 wherein at least the inner layer is composed of nonwoven spun-bonded thermoplastic fibers having the smooth glazed tough surface.

5. The cover of claim 1 wherein the layers have a thickness of about 1 to 5 mils.

6. The cover of claim 1 wherein the layers have an air permeability of 200 to 400 liters of air per square decimeter per minute.

7. The cover of claim 1 wherein the layers are spun-bonded thermoplastic fiber sheets each having a weight of about 1.5 to 2.5 ounces per yard.

8. The cover of claim 2 wherein the bag has an inner layer of dark colored polyester fibers and an outer layer of light colored polypropylene fiber.

9. The cover of claim 2 including a drawstring slidably mounted around the periphery of the mouth of the bag to close the bag.

10. The cover of claim 2 including flaps adapted to be outturned around the open end of the bag to radiate from the base of the bush.

11. The bag of claim 3 including a draw string around the bag for closing the mouth of the bag.

* * * * *